Feb. 4, 1941.   G. W. BICKERTON   2,230,282
GOLF METER
Filed Jan. 11, 1939   3 Sheets-Sheet 1

INVENTOR
George W. Bickerton
BY
J. E. Dickinson
ATTORNEY

Feb. 4, 1941.  G. W. BICKERTON  2,230,282
GOLF METER
Filed Jan. 11, 1939  3 Sheets-Sheet 2

INVENTOR
George W. Bickerton
BY
J. E. Dickinson
ATTORNEY

Feb. 4, 1941.  G. W. BICKERTON  2,230,282
GOLF METER
Filed Jan. 11, 1939  3 Sheets-Sheet 3

INVENTOR
George W. Bickerton
BY J. E. Dickinson
ATTORNEY

Patented Feb. 4, 1941

2,230,282

UNITED STATES PATENT OFFICE 2,230,282

GOLF METER

George Wilson Bickerton, Cuyahoga Falls, Ohio

Application January 11, 1939, Serial No. 250,273

6 Claims. (Cl. 273—35)

This invention relates to improvements in a golf stroke indicating apparatus and pertains more particularly to improvements in apparatus of the type disclosed in United States Letters Patent No. 1,967,076 granted on July 17, 1934, and wherein a captive ball similar in character to a standard golf ball is arranged to be projected into flight when struck by a golf club and associated with a mechanism adapted to give an accurate indication of the travel of the ball, irrespective of the manner of contact of the club head insofar as distance and angle of flight of the ball is concerned.

An object of this invention is to improve the operating characteristics of a measuring instrument of this character, and particularly its sensitivity, durability, and accuracy.

An outstanding feature of the invention resides in the ability of the equipment so provided to indicate the deviation in flight of the ball from a line passing through the ball and an imaginary point toward which the ball should be aimed. A further feature of the invention is incorporated in the means and manner that the ball is secured to the flight recording mechanism.

Figure 1:
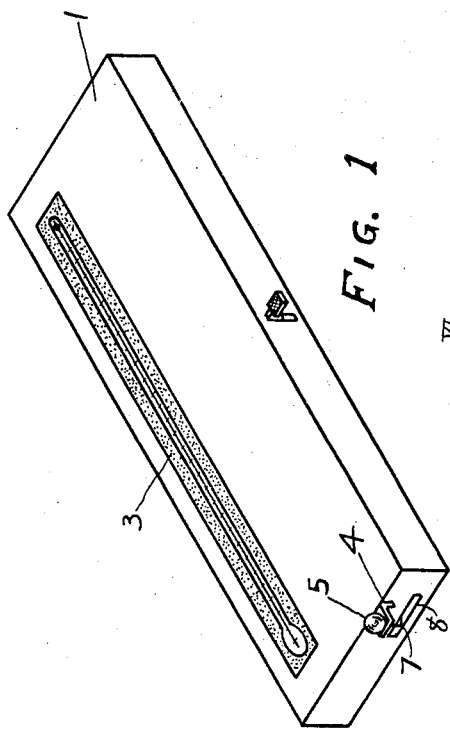
Figure 2:
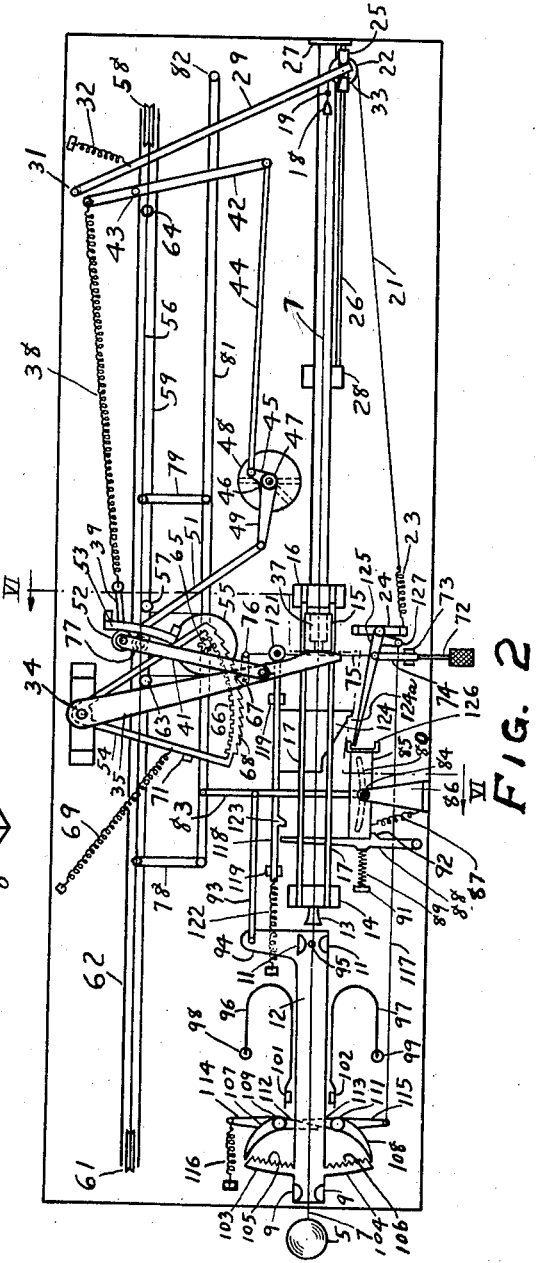
Figure 3:
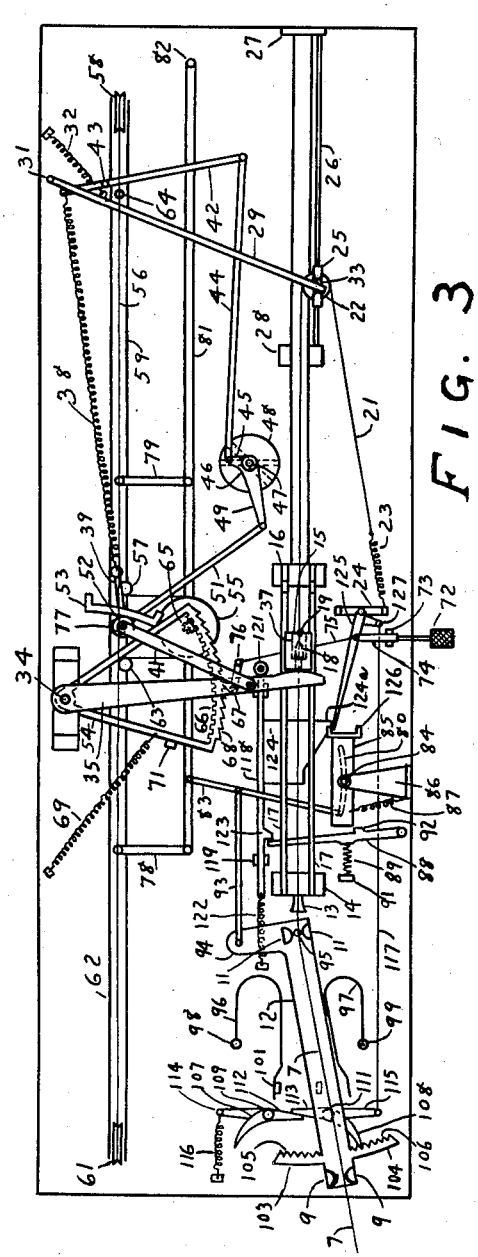
Figure 4:
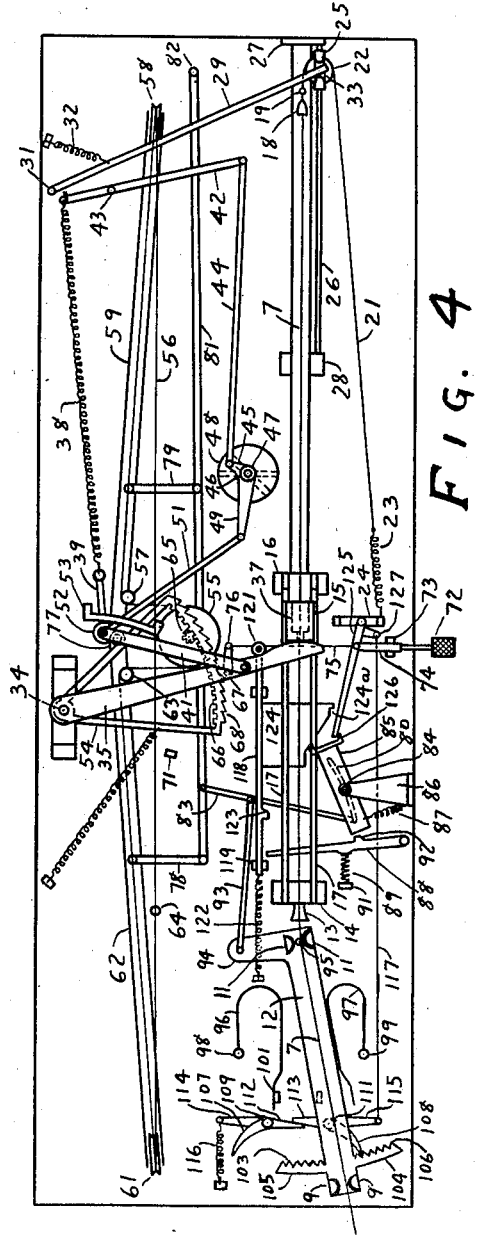
Figure 5:
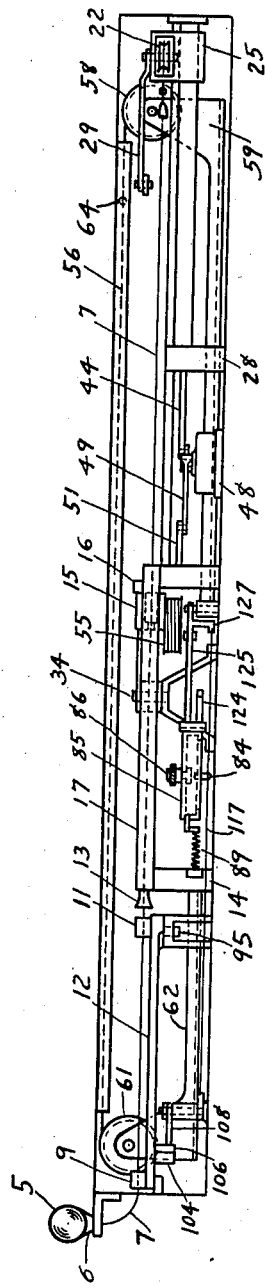
Figure 6:
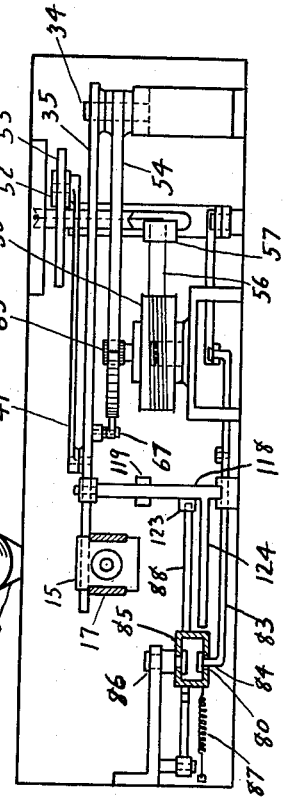

These and various other objects, as well as the various other novel features and advantages of the invention, will be fully apparent when the following detailed description is read in conjunction with the accompanying drawings, of which Fig. 1 is a perspective view taken from an angle looking at the top of a golf meter constructed in accordance with my invention; Fig. 2 a top plane view of the same with the top cover, comprising a miniature fairway removed, and showing the operating parts in detail; Fig. 3 is a view similar to Fig. 2, showing the parts of the moving device when the ball is at the end of its projection; Fig. 4 another view similar to Fig. 2, showing the parts of the device in the position they assume when indicating the flight of the ball; Fig. 5 a side elevational view of the device with its side casing removed; Fig. 6 a sectional view taken on the line VI—VI of Fig. 2; and Fig. 7 a detailed view, partly in section, of the captive ball and the cable to which it is secured.

Referring in detail to the embodiment of the invention illustrated in the drawings, the numeral 1 designates a housing or casing within which the moving parts of the meter are supported. In the top of this casing and adjacent one of the longer sides, there is provided a narrow elongate opening 2 beneath which a plate 3 is secured that is decorated to simulate the tee, fairway, rough, and green of a golf hole and to function as the recording face of the meter.

Adjacent the side of the housing 1 opposite the fairway 3 and at one end thereof, a bracket 4 is provided to support a captive ball 5 that is used as the object, the flight of which is to be measured or indicated. This ball as near as possible is made of the same size and weight as a standard golf ball, but for convenience and durability it is provided with an integral boss 6 which functions as a tee to support it in a position to be readily engaged by the head of a golf club.

Through the bottom of the boss 6 on the captive ball 5 there is attached a cable 7 which normally extends through an axial slot in the bracket 4 and into the housing through a slot 8 in its front wall. This latter slot is made elongate in shape and extended transversely of the housing so that the cable 7 can move laterally therein, in the event the ball 5 is driven from the tee at an angle instead of parallel with the centerline of the housing. From the slot 8 in the end of the housing the cable 7 is extended on a straight line between two sets of spaced upwardly projecting guides 9 and 11 provided on a pivoted element 12, a throat 13 secured to a support 14, a hollow anvil block 15 normally engaging a stop 16 and mounted for guided movement on a pair of parallel guides 17 secured to the throat support 14 and the axial stop 16, and connected by a releasable connector 18 and a swivel 19 to a second cable 21. This latter cable is extended around a pulley 22 and connected to a coil spring 23 which is in turn connected to a support 24.

In order to relieve the cables 7 and 21 from grief due to shock when the captive ball is hit, the pulley 22 is mounted in a bracket 25 that is in turn mounted for movement on a guide rod 26 secured between a pair of anchors 27 and 28 and this bracket yieldably biased toward its retracted position by a lever 29 which is secured by a pivot 31 to the frame of the housing and has connected between it and the housing a coil spring 32 so disposed as to compensate for variance in the position of the lever 29, the latter being extended through a slot 33 in the pulley bracket 25.

Slightly forward of the anvil block 15 and below the fairway 3 a pivot shaft 34 is secured to the housing 1 and to this there is rotatably secured a lever 35 which is positioned with its free end normally engaging the upper edge of the front face of the anvil block so that it will be moved toward the front of the machine when the anvil block is moved in that direction. This movement of the anvil block is caused by the connector 18 on the cable 7 striking it when the captive ball is driven off the tee, the connector 18 being adapted to move into an opening 37 in the anvil block, strike the latter, and carry it forward as the cable moves outward.

For normally holding the lever 35 against the anvil block and returning it thereto after it has been driven outward, a coil or other suitable spring 38 is employed. This spring is connected at one end by a connector 39 and an arm 41 to the lever 35. At its other end it is connected to one end of a lever 42 that is pivoted at 43 between its ends to the housing and has its opposite end connected to a connecting rod 44 that is in turn connected to one arm 45 of a bell crank 46 mounted on the operating shaft 47 of a one-way fluid brake 48. The other arm 49 of the brake operating bell crank 46 is connected by a rod 51 to the outer end of the arm 41 which carries a roller 52 which is disposed to travel on a curved guide or cam 53 mounted on the housing 1.

The levers 35 and 42 and the rods 41 and 51, as well as the pivot 43 and the cam 53, are so designed, and the strength of the spring 38 is so proportioned that the movement of the lever 35, due to impact therewith of the anvil 15, will be directly proportional to the normal distance of travel of the ball 5 when hit by a golf club. To permit this result the brake 48 is designed so that it will not interfere with the outward movement of the lever 35, but will control its return movement by the spring 38.

Also mounted for rotary movement on the pivot shaft 34 carrying the anvil operated lever 35 is a substantially V-shaped element 54 which is employed to actuate a pivoted drum 55 about which a recording cable 56 is wound. This cable is wound several times around the drum 55, thence around a horizontal pulley 57 to a vertical pulley 58 mounted on a rod 59 up over and along the top of the fairway 3, to a second vertical pulley 61 on a second rod 62, from which it is passed back around a second horizontal pulley 63 to the drum 55.

On this recording cable 56 there is mounted a dummy ball 64 that is normally retained in a position directly above the tee at the end of the fairway 3. Consequently as the drum 55 is rotated in one direction, it carries the dummy ball 64 down the fairway 3 toward the green, and when operated in the opposite direction, it is returned to its original position.

The actuation of the drum 55 is accomplished as follows. A pinion 65 is secured to the drum 55 and meshed with an arc-shaped gear face 66 forming on the inside of the lower end of the V-shaped element 54, so that when the latter is rotated, it will rotate the drum. To rotate the drum a dog 67 is pivotally mounted on the lever 35 in a manner to engage teeth 68 on the outer face of the V-shaped element 54 when the lever 35 is moving rearwardly and to slide freely over the teeth 68 when the lever 35 is moving forwardly. In this way the forward movement of the lever 35 is not encumbered by the weight of the V-shaped element 54 and the rotation of the drum is controlled by the recoiling of the spring 38 and the brake 48.

To return the V-shaped element to its normal position of rest, a spring 69 is connected between it and the housing 1, and a stop 71 is mounted on the housing to bring the V-shaped element to rest when the dummy ball is in the desired position over the tee. The return of the V-shaped element 54, of course, cannot be accomplished until the dog 67 is released, and to accomplish this a trip 72 is employed. This is pivotally mounted at the driving side of the housing and is equipped with an upwardly projecting arm 73 which is connected by a link 74 and cable 75 to the tail piece 76 of the dog 67. As will thus be appreciated, the dummy ball is in this way retained in its projected position until the trip 72 is operated, which is desirable since it affords the operator a better opportunity to study the flight of the ball.

An important feature of this improvement resides in the mechanism provided for recording the deviation of the ball from its intended flight occasioned by a faulty blow of the club head and conventionally referred to as a hook or a slice. To accomplish this the inner ends of the recording cable supporting rods 59 and 62 are pivotally supported at their abutting ends on a pivot 77. Thus by deflecting the outer ends of the rods 59 and 62 the recording cable 56 may be caused to throw the dummy ball 64 into the sides of the fairway depending upon the direction to which these rods are actuated.

For actuating these rods a pair of links 78 and 79 is pivotally connected to their mid sections and to a lever or rod 81 which is pivotally connected at one end by a pivot 82 to the meter frame. This rod in turn has a rod 83 connected to it which is provided with a trunnion 84 on its free end that is fitted in a curved slot 80 provided for its reception in a guide beam 85. The latter beam is pivotally supported at its center in a support 86 and normally urged to rotate in a counter clockwise direction by a coil spring 87 connected between it and its support 86. To hold it, however, in its initial position a latch member 88 is employed, which is pivoted to the frame and backed up by a compression spring 89 disposed between it and a post 91, the spring normally holding it against the end of the beam 85 and a lug 92 on the latch 88 engaging the under side of the beam to prevent its rotation.

For moving the rod 83 in accordance with the departure of the captive ball from its intended flight, a rod 93 is connected between it and an arm 94 formed on the guide element 12. This latter is pivotally supported on a shaft 95 and yieldably urged toward a position parallel with the side of the housing 1 by a pair of springs 96 and 97 that are connected at one end by pins 98 and 99 to the housing and have their free ends resting against stops 101 and 102, maintaining them adjacent and in a position to engage the opposite sides of the element 12. The stops 101 and 102, prevent the springs moving the element 12 over center, while the springs tend to return it to center if it tends to depart therefrom.

When the ball 5 is knocked sideways, the cable 7 attached to it engages one or the other of the guides 9 on the outer end of the element 12 and causes the element 12 to move it. (See Figs. 3 and 4). This in turn causes the rod 83 to be moved and its trunnion 84 to assume a position in the slot 80 of the guide beam 85 proportioned insofar as movement is concerned to the movement of the element 12.

To hold the element 12 temporarily in a deflected position for a purpose which will presently appear, arcuate shaped arms 103 and 104 are formed on the sides of the outer end of the element 12 and provided with teeth 105 and 106 on the inner face thereof into which the ends of latches 107 and 108 are adapted to engage. These latches are pivotally mounted on pivots 109 and 111 and have on them a pair of overlapping tail pieces 112 and 113 and a pair of outwardly projecting arms 114 and 115. To the one latch arm 114 there is connected a spring 116 and to the other 115 a releasing cable 117. The tail pieces 112 and 113 are so arranged that the springs 116 normally bias both latches against the arms 103 and 104 and the cable is rendered operable for releasing both latches. The teeth engaging ends of the latches, however, are adapted to normally project beyond the ends of the arms 103 and 104 so that they will not interfere with the initial movement of the element 12.

With the guide beam 85 held in a position parallel with the captive ball cable 7, the trunnion on the rod 83 is allowed to move freely in the slot 80 and under such circumstances the rod 83 does not effect any movement in the rods 59 and 62. To bring about this movement a trip rod 118 is provided. This rod is mounted in guides 119 for endwise movement only and is equipped at one end with a roller 121 which bears against the back of the lever 35 and has attached to its other end a spring 122 connected to the frame which normally urges it outwardly, but not with sufficient pull to overcome the tension of spring 38.

To the underside of this trip rod 118 there is affixed a lug 123 for tripping the lever or latch 88 which holds the guide beam in its normal position and a cam 124 which is operative to engage the end of the beam 85 opposite the latch 88 and control the position of the latter for a limited period.

From the foregoing it will be seen that when the lever 35 is moved forward the spring 122 will cause the rod 118 to follow it, and hence cause the lug 123 to engage the upper end of the latch 88 and the cam 124 to engage the end of the beam 84 adjacent thereto, a notch 124—a being provided in this cam for that purpose. The cam 124 and the lug 123 on the rod 118 are so spaced, however, as to cause the cam 124 to engage the beam 85 just before the lug 123 releases the latch 88. Thus the beam 85 is held against rotation by the spring 87 until after the lever 35 has completed its full forward stroke and is returned far enough to pull the cam 124 out of engagement with the beam 85, which it does in its back stroke and before the lug 123 permits the latch 88 to engage opposite ends of the beam.

At the instant the beam 85 is released by the cam 124, the beam is rotated by the spring 87 and in rotating causes the rod 83 to move up or down depending on which side of the pivot 86—a the trunnion 84 may have been moved to by the element 12. This movement as will be appreciated causes the rods 59 and 62 to be moved in a corresponding direction. On the other hand, if the ball is not deflected from its normally intended flight and the element 12 is not as a result moved, the trunnion on the rod 83 will remain in line with the pivot 86—a and no movement of rod 83 will result from rotation of the beam 85 when cam 124 releases, consequently permitting the dummy ball 64 to travel down the center of the fairway 3.

To reset the beam 85 a reset lever 125 is provided. This lever is pivotally secured to the support 24 and arranged so that its outer end will engage lugs 126 provided for that purpose on the end of beam 85. To operate the reset lever it is connected by the link 74 to the trip pedal 72 and on it is an arm 127 to which the cable attached to the latch arm 115 is connected. Consequently when the pedal 72 is pressed down, the following occurs simultaneously. The latch 107 or 108 is released, the dog 67 is released, and the beam 84 is reset. This permits the element 12 to return to normal position, as well as the V-shaped element 54, which in turn returns the dummy ball to the tee.

Figure 7:
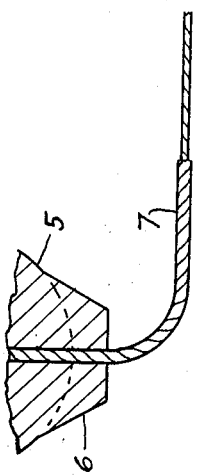

With reference to Fig. 7, the captive ball cable is preferably a twisted cable made out of two cables formed of gut or the like and superimposed one upon the other and twisted in opposite directions. The purpose of this is to provide a cable which is best suited to withstand the twisting action imparted thereto by the ball 5 when a slice or a hook occurs.

The operation of this particular embodiment of the invention may be described briefly as follows. The meter is first set for operation by pressing down on the release or reset pedal 72, placing the machine in position for recording operation. When this is done, the captive ball may be driven from its tee in the conventional manner by striking it with a golf club. As the ball is projected from its tee, the cable 7 is moved outward. In this movement the element 12 is deflected if the flight of the ball is off line and the connector element 18 is driven against the anvil block 15. This in turn engages the lever 35 and moves it forward a distance directly proportionate to the momentum imparted to the captive ball, such being brought about by the design of the means resisting the actuation of the lever 35.

With the movement of the element 12, if such occurs, the rod 83 is moved and its trunnion 84 slid along the slot 89 in the beam 85. At the same time the cam rod 118 is carried forward with the lever 35 by the spring 122, causing the lug 123 to release the latch 88 and the cam 124 to engage the beam 85. The cable 7 also carries the pulley 22 forward against the spring 32 at this time.

When the element 12 reaches its farthest deflected position, one or the other of the latches 107 or 108 engages it and holds it and the rod 83 in the position attained. When the lever 35 reaches its outermost position, the dog 67 engages the teeth 68 on the V-element 54. The lever 35 is then retracted by the spring 38, carrying with it the V-element 54 and the latch rod 118 and the spring 32 returns the pulley 22 to its original position. The V-element in so moving drives the pinion 65 causing the drum 55 to rotate and the dummy ball cable 56 to project the dummy ball 64 down the fairway. As soon as the cam 124 on the back stroke of the rod 118 moves out of engagement with the end of the beam 84, the beam is rotated by the spring 87. Depending upon the position of the rod 83 which is at this time held by the latch 107 or 108, the rotation of the beam 84 causes the rods 59 and 62 to be deflected, throwing the cable 56 to the corresponding side of the fairway, registering the manner in which the captive ball is driven away from the normally intended path of flight. After these movements are all completed, no additional movement takes place until the reset pedal is operated, and then, as previously described, the machine automatically resets itself.

According to the provisions of the patent statutes, I have explained the principle and mode of operation of the invention, and have illustrated and described the herein illustrated embodiment. However, I desire to have it understood that, within the scope of the appended claims, the invention may be practiced otherwise than as specifically illustrated and described.

What is claimed is:

1. In a golf meter, a captive ball, a cable attached to said ball, resilient means securing said cable to an anchor, a pulley disposed for movement in the plane of said cable and around which the cable is extended, a pivoted rod engaging said pulley, resilient means urging said pulley in a direction tending to retract said cable, a pivoted element provided with guides located in the path of the cable, an object ball for indicating the travel of said captive ball, a cable for said object ball, a pair of pulleys over which said latter cable is extended, a rotary drum having said object ball cable attached to it, pivoted means supporting the pulleys for said object ball cable, means for rotating said drum, means actuated by said first-mentioned cable for actuating said drum rotating means, and means set in motion by said pivoted guide element for deflecting said object ball cable according to deflections imparted to the captive ball when hit.

2. In a golf meter according to claim 1, a pivoted lever having its free end disposed adjacent said captive ball cable, and comprising the means for imparting movement from said captive ball cable to said drum rotating means, means on said latter cable for engaging said lever, a gear element comprising said drum rotating means disposed to engage said drum and be operated in one direction by said lever, spring means for actuating said gear element in one direction, and brake means disposed to retard and control the operation of said spring means.

3. In a golf meter according to claim 1, a pivoted object ball deflecting element which is provided with an arcuate guide in it, a spring tending to rotate said element, latch means normally holding said element in predetermined position, a pivoted lever having its free end disposed adjacent said captive ball cable, means on said latter cable for imparting movement to said latter lever when the captive ball is driven, and means actuated by said cable-operated lever for releasing said element, and means engaging the arcuate guide in said element for moving the supports for said object ball cable pulleys when the captive ball cable in its outward travel moves said pivoted guide elements.

4. In a golf meter according to claim 1, a gear element comprising said drum rotating means which is disposed to engage said drum and operate it in opposite directions, a pivoted lever provided with means for engaging and operating said gear element in one direction, means on said captive ball cable for actuating said pivoted lever when the captive ball is driven outwardly, a latch for connecting said lever to said gear element, spring means for returning said pivoted lever to its initial position and also actuate said gear element, resilient means for operating said gear element in a direction opposite to that caused by said pivoted lever, and means for releasing the latch for said pivoted lever at the will of the operator.

5. In a golf meter according to claim 1, means for releasably holding said pivoted guide element for deflecting said object ball cable in a deflected position, means normally tending to maintain said guide element in a selected position, and means for releasing said guide element at the will of the operator.

6. In a golf meter according to claim 1, a gear element comprising said drum rotating means which is disposed to engage and operate said drum, a pivoted lever releasably engaging said gear element, means on said captive ball cable for engaging and actuating said pivoted lever when said captive ball is driven outwardly, a retriever spring for returning said pivoted lever to its initial position, a rod connected between said pivoted lever and one end of said spring, means disposed to guide the movement of the end of said rod attached to said spring, a pivoted lever attached to the opposite end of said spring, connecting means including a one-way fluid brake connected between said latter lever and a connecting rod connected to the first mentioned end of said retriever spring.

GEORGE WILSON BICKERTON.